United States Patent Office 3,526,670
Patented Sept. 1, 1970

3,526,670
PROCESS FOR INCREASING PERMANGANATE
TIME OF METHANOL
Anthony H. Conrad, Jr., Texas City, William G. Cooper, Dickinson, and Johnny L. Slate, Texas City, Tex., assignors to Monsanto Company, St. Louis, Mo., a corporation of Delaware
No Drawing. Continuation-in-part of application Ser. No. 633,389, Apr. 25, 1967. This application May 23, 1969, Ser. No. 827,167
Int. Cl. C07c *29/24*
U.S. Cl. 260—643                 4 Claims

ABSTRACT OF THE DISCLOSURE

A process for increasing the permanganate time of purified methanol by contacting the purified methanol with a lithium-sodium silicate solution either alone or in admixture with zinc powder.

CROSS-REFERENCE TO RELATED CASE

This is a continuation-in-part of copending application Ser. No. 633,389, filed Apr. 25, 1967, and now abandoned.

BACKGROUND OF THE INVENTION

This invention relates to a process for increasing the so-called "permanganate time" of purified methanol. Methanol produced synthetically by hydrogenation of carbon monoxide is required to meet certain rigid specifications. One of the more stringent requirements which the methanol must pass is the so-called "permanganate time" test. Essentially, this test consists of adding a fixed quantity of a potassium permanganate solution to a given amount of methanol and measuring the time required for reduction of the permanganate as evidenced by disappearance of the purple color. Generally speaking, the longer the time required for disappearance of the permanganate color, the better is the quality of the methanol. Although the so-called federal "specification" on permanganate time for synthetic methanol is 30 minutes, permanganate times of 50 to 60 minutes or longer are desired and usually required if the methanol is to be acceptable for use in the production of formaldehyde and other catalytic processes where extremely high purity is required. While it is known that the presence of ketones and aldehydes in the methanol will severely shorten the permanganate time, it has been found that even when these impurities have been substantially removed, the purified methanol frequently shows undesirably short permanganate times. In view of this latter problem, it would be desirable to have a method for increasing the permanganate time of purified methanol, i.e., methanol which is substantially free from ketones, aldehydes, and other impurities.

SUMMARY

In accordance with the present invention, the permanganate time of purified methanol is markedly increased by contacting the purified methanol either with a liquid composition comprising a lithium-sodium silicate solution or a mixture comprised of a lithium-sodium silicate solution and zinc powder and then separating the methanol from said solution or mixture. In one embodiment of the invention, a small amount of an aqueous solution of a mixture of lithium and sodium silicate, the lithium and sodium silicates being employed in amounts sufficient to provide a ratio of lithium oxide to sodium oxide to silicon dioxide, respectively, within the range from about 0.75 to about 1.00:about 0.05 to about 0.25:about 2.5 to about 5.0, is added to the purified methanol under agitation. The lithium-sodium silicates precipitate out and the purified methanol is easily separated therefrom by filtering, decanting, centrifuging or like techniques well known in the art. In another and preferred embodiment of the invention, zinc dust is dispersed in the lithium-sodium silicate solution and the resulting dispersion is applied to the inside of a container and allowed to dry to form a hard coating thereon. Purified methanol is then charged to the container and maintained in intimate contact, preferably in an agitated condition, with said coating for a sufficient period of time to increase the permanganate time to the desired level.

DESCRIPTION OF THE PREFERRED EMBODIMENT

The lithium-sodium silicate solution which is the liquid composition employed in one embodiment of the present invention is prepared by adding lithium hydroxide, preferably the monohydrate, sodium hydroxide and silica-containing materials such as silicic acid and silica gel to water while agitating same, following which the admixture is heated while continuing the agitation thereof to a temperature within the range from about 75° to about 150° C. for a sufficient length of time to form a mixture of sodium and lithium silicates. The sodium and lithium hydroxide and the silica-containing material are used in amounts sufficient to provide a ratio of lithium oxide to sodium oxide to silicon dioxide within the range from about 0.75 to about 1.00:about 0.05 to about 0.25:about 2.5 to about 5.0, respectively, following which the admixture is cooled to a temperature within the range from about 20° to about 30° C. at which temperature any solids go into solution and form an aqueous solution thereof. After the solution has cooled, a small amount of an alkaline dichromate, such as sodium or potassium dichromate, is added. The total solids contained in the liquid composition should be in the range of about 24 to about 31% by weight as determined by heating a weighed quantity of the liquid composition at 110° C. for two hours and then weighing to determine the percent of solids.

When the preferred embodiment of the invention is practiced, the treating agent used is prepared by incorporating finely-divided zinc into the above described liquid composition. In this aspect of the invention, the liquid composition is prepared as above and the finely-divided zinc is then added to the cooled solution in amounts sufficient to provide a hard coating when the composition is applied to the inner surfaces of the containers to be used. Optionally, there may be added to the cooled solution prior to or simultaneously with the zinc, an alkaline borate, iron oxide, alkaline bicarbonate, and other metals and compounds, if desired, which improve the characteristics of the coating.

The finely-divided zinc is preferably zinc powder or dust having a particle size within the range from about 3 to about 25 microns; however, a preferred particle size is within the range from about 6 to about 10 microns. The zinc dust should be admixed with the sodium-lithium silicate solution in a weight ratio of about 2:1 to about 4:1 with a preferable range being 3:1. With the zinc dust may be used other metallic dusts, such as alumina dust, and selected metal oxide dusts, such as manganese dioxide, titanium dioxide, iron oxide, and the like. It is preferred, however, that when other metallic ingredients are employed that the zinc dust be used in a major amount.

A preferred molar ratio of lithium oxide to sodium oxide to silicon dioxide in the liquid composition when zinc dust is added is 0.8:0.2:4.5. The total weight percent of the lithium hydroxide and sodium hydroxide in the solution containing the zinc dust may range from about 5.0 to about 15.0%. The amount of silica gel or silicic acid may range from about 8 to about 25% by weight.

It is also desirable in this aspect of the present invention to employ an alkaline borate such as sodium borate, potassium borate, and ammonium borate in an amount from about 0.01 to about 0.20% by weight to reduce the friability of the coating. Also, the addition of an alkaline bicarbonate, such as sodium or ammonium bicarbonate, in an amount from about 0.01 to about 0.20% by weight is desired to accelerate the curing of the coating.

The addition of an alkaline dichromate such as potassium dichromate or sodium dichromate is an important feature in lengthening pot life when zinc dust is employed. For example, the use of 0.05 to 0.10% by weight of potassium dichromate in the lithium-sodium silicate solution substantially lengthens the pot life.

When the process of the invention is carried out by adding the liquid composition comprising the lithium-sodium silicate solution to the purified methanol, the former should be added in amounts from 0.05 to about 0.15% by weight with a preferable amount being 0.10%. It is desirable that the purified methanol be agitated while adding the liquid composition to facilitate contact and mixing. The contact time of the liquid composition with the purified methanol is not critical and need only be long enough to insure adequate mixing. For example, a contact time of one minute is sufficient with proper mixing. The temperature at which the contacting is carried out can range from 0° to 50° C. When the liquid composition is added to the purified methanol, the lithium-sodium silicate precipitates out, hence, the treated methanol can be easily separated by filtering, decanting, distilling, centrifuging or other techniques well known in the art.

In using the preferred embodiment of this invention, the zinc dust is dispersed in the liquid composition as explained above. The dispersion is then used to coat the inside of a container in which the purified methanol is placed. After the coating has dried to a hard surface, generally about 2–3 hours, purified methanol is added to the container and kept there for a sufficient period of time to insure adequate contact with the coating, the methanol being tested periodically to determine the increase in permanganate time. Generally, the size of the container is not a critical factor if the time of contact is at least 20 hours, i.e., a significant increase in permanganate time is noted after 20 hours regardless of the ratio of the volume to the internal surface area of the container. This apparent anomaly can be explained by the fact that internal mixing due to convection occurs more readily in larger containers than in smaller ones. The contact time required to increase the permanganate time to the desired value can be greatly shortened if provision is made for agitation of the methanol while it is being maintained in the coated container.

The temperature at which this embodiment of the invention is practiced is not critical but can vary from 0° C. and below to 50° C. As will be understood by those skilled in the art, any vessel, container or tank in which the methanol is held in or transferred through can be coated to successfully carry out the process of this invention. Examples of such containers and vessels include railroad tank cars, storage tanks, and pipes.

The invention will be further demonstrated by the following examples which are given by way of illustration only and not as a limitation on the scope thereof. All parts given are by weight.

EXAMPLE 1

Into a stainless steel pressure vessel equipped with an agitator are charged the following: 1.54 parts of sodium hydroxide, 4.81 parts of lithium hydroxide monohydrate, 20.69 parts of silica gel and 72.91 parts of water. The vessel is then sealed and the temperature and pressure of the contents, under continual agitation, are raised to 150° C. and 60 lb. per square inch within 30 minutes. When the temperature reaches 130° C., the contents of the vessel are slowly cooled at an averagte rate of 0.34° C. per minute which results in a temperature drop from 150° C. to 25° C. in 360 minutes. The pressure vessel is then opened and 0.05 part of potassium dichromate are added to the solution under vigorous agitation. When all the chromate has completely dissolved, the finished lithium-sodium silicate solution is withdrawn from the vessel.

EXAMPLE 2

About 0.10 percent by weight of the lithium-sodium silicate solution prepared according to Example 1 was added to a container of purified methanol under agitation. After about five minutes, 50 ml. of the treated methanol was removed. The permanganate time was then determined by treating the 50 ml. aliquot with 2.0 ml. of a 0.02% solution of potassium permanganate at 15° C. and measuring the time required for reduction of the permanganate as evidenced by disappearance of the purple color. Permanganate time was determined in like manner on a sample of purified methanol which had not been treated with the lithium-sodium silicate solution. The results of the two tests were as follows:

| | Permanganate time in minutes |
|---|---|
| Untreated methanol | 60 |
| Treated methanol | 150 |

As can clearly be seen from the above example, the addition of the lithium-sodium silicate solution markedly increased the permanganate time of the purified methanol.

EXAMPLE 3

A dispersion of 1 part of the lithium-sodium silicate solution prepared according to Example 1, and 3 parts of zinc dust having a particle size from 6 to 10 microns was prepared and used to coat the inside of a freshly sandblasted steel tank having an internal surface area of 1.5 sq. ft. and a volume of about 1 gallon. The coating was allowed to dry to a hard surface. The tank was then filled to within 2 inches of the top with purified methanol having a permanganate time ot 55 minutes. Samples were periodically removed from the tank and the permanganate time determined according to the procedure of Example 2. The results obtained on samples are shown below.

| Time of contact in coated tank in hours | Permanganate time in minutes |
|---|---|
| 0 | 55 |
| 2 | 65 |
| 3 | 68 |
| 4 | 72 |
| 5 | 75 |
| 6 | 77 |
| 8 | 82 |
| 30 | 89 |
| 48 | 96 |
| 63 | 98 |
| 78 | 100 |

EXAMPLE 4

A dispersion of 1 part of the lithium-sodium silicate solution prepared according to Example 1 and 3 parts of zinc dust having a particle size from 6 to 10 microns was prepared and used to coat the inside of a railroad tank car having an internal surface area of approximately 900 sq. ft. and a volume of about 10,000 gallons. The coating was allowed to dry to a hard surface. The tank car was filled with purified methanol having an initial permanganate time of 74 minutes. Samples were periodically withdrawn from the tank car and the permanganate time thereof determined according to the procedure of Example 2. The results obtained on the samples are shown below.

| Time of contact in coated tank car in hours | Permanganate time in minutes |
|---|---|
| 0 | 74 |
| 20 | 84 |
| 67 | 105 |

As is demonstrated by the above data, the permanganate time of purified methanol can be increased by maintaining said methanol in a container, the inside of which is coated with the dispersion of the zinc powder in the lithium-sodium silicate solution. It should also be noted that the increase in permanganate time is apparently relatively independent of the ratio of volume to internal surface area of the container being used. For example, note that after 20 hours even in the 10,000 gallon tank, a marked increase in permanganate time occurs. Further, as seen in Example 3, the tank used has a volume to internal surface area ratio (gals./sq. ft.) of approximately 0.67:1 whereas in Example 4 the tank car employed has a volume of internal surface area ratio of around 10:1. In spite of this large difference, the permanganate time of the methanol maintained in the small tank for 63 hours increased approximately 43 minutes whereas the permanganate time of the methanol maintained in the tank car of Example 4 for 67 hours increased approximately 31 minutes. These two values are of the same order of magnitude and very nearly within the experimental error of the permanganate time measurement. This data clearly indicate that the volume to internal surface area ratio of the tank used for storage is not a critical factor.

The above examples and data clearly indicate that the permanganate time of purified methanol can be markedly increased by the practice of this invention.

What is claimed is:

1. The method for increasing the permanganate time of purified methanol which comprises contacting said methanol with a liquid composition having a total solids content of about 24 to about 31% by weight comprising an aqueous solution of a mixture of lithium silicate and sodium silicate, said lithium silicate and said sodium silicate being employed in amounts sufficient to provide a molar ratio of lithium oxide to sodium oxide to silicon dioxide within the range from about 0.74 to about 1.00: about 0.05 to about 0.25: about 2.5 to about 5.0, and an alkaline dichromate in an amount from about 0.05 to about 0.10% by weight.

2. The method of claim 1 wherein the amount of said liquid composition contacted with said methanol is in the range of about 0.05 to about 0.15% by weight.

3. The method for increasing the permanganate time of purified methanol which comprises maintaining said methanol for at least 20 hours in a container, the inside walls of which are coated with the hardened product of (a) a liquid composition having a total solids content of approximately 24 to about 31% by weight comprising an aqueous solution of a mixture of lithium silicate and sodium silicate, said lithium silicate and said sodium silicate being employed in amounts sufficient to provide a molar ratio of lithium oxide to sodium oxide to silicon dioxide within the range from about 0.75 to about 1.00: about 0.05 to about 0.25: about 2.5 to about 5.0 and an alkaline dichromate in an amount from about 0.05 to about 0.10% by weight, and (b) zinc powder, the ratio of the weight of said zinc powder to the weight of said liquid composition being from about 2:1 to about 4:1.

4. The method of claim 3 wherein the particle size of said zinc powder is within the range of about 3 to about 25 microns.

References Cited

UNITED STATES PATENTS

| 2,647,150 | 7/1953 | Askerold. |
| 2,965,680 | 12/1960 | Anderson et al. |
| 3,290,396 | 12/1966 | Starks et al. |

BERNARD HELFIN, Primary Examiner

J. E. EVANS, Assistant Examiner

U.S. Cl. X.R.

105—358; 106—85; 117—95, 123; 260—449.5